(12) United States Patent
Hampton

(10) Patent No.: US 8,853,593 B2
(45) Date of Patent: Oct. 7, 2014

(54) HEAT PIPE COOLING SYSTEM FOR USE WITH A WELDING TORCH

(75) Inventor: Jay Hampton, Lenox, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1813 days.

(21) Appl. No.: 12/051,042

(22) Filed: Mar. 19, 2008

(65) Prior Publication Data
US 2009/0236326 A1 Sep. 24, 2009

(51) Int. Cl.
*B23K 9/00* (2006.01)
*F28D 15/00* (2006.01)
*B23K 9/28* (2006.01)
*F28D 15/04* (2006.01)

(52) U.S. Cl.
CPC .............. *B23K 9/285* (2013.01); *F28D 15/046* (2013.01)
USPC .................. 219/136; 219/137.41; 165/104.21

(58) Field of Classification Search
USPC ........................ 219/74, 75, 126, 136, 137.62; 165/104.21, 104.26
See application file for complete search history.

(56) References Cited

U.S. PATENT DOCUMENTS

| 4,109,131 A * | 8/1978 | Schluter .................... 219/137.62 |
| 5,150,748 A * | 9/1992 | Blackmon et al. .............. 165/41 |
| 6,211,490 B1* | 4/2001 | Nosse ....................... 219/137.62 |
| 6,586,708 B1* | 7/2003 | Cusick, III ............... 219/137.62 |
| 2006/0222423 A1* | 10/2006 | Dejong et al. ................. 399/333 |

FOREIGN PATENT DOCUMENTS

CN 1416962 A 5/2003

* cited by examiner

*Primary Examiner* — Brian Jennison
(74) *Attorney, Agent, or Firm* — Quinn Law Group, PLLC (57) ABSTRACT

A heat pipe cooling system adapted for exemplary use with a gas metal arc welding torch, includes a container enclosing a capillary structure and quantity of working fluid, and functions to accelerate the dissipation of heat energy from a heated zone generated by the torch through the vaporization and condensation of the fluid and the capillary action of the structure.

19 Claims, 6 Drawing Sheets

HEAT PIPE COOLING SYSTEM FOR USE WITH A WELDING TORCH

BACKGROUND OF THE INVENTION

1. Technical Field

The present invention relates to welding torch cooling systems, and more particularly, to a heat pipe cooling system, including a container, a working fluid housed therein, and a wick operable to draw the fluid up the container. The system is configured to remove heat energy from a heated zone by the vaporization, migration, and re-condensation of the fluid over repetitive thermodynamic cycles.

2. Discussion of Prior Art

Gas Metal Arc Welding (GMAW), including its metal inert gas (MIG) and metal active gas (MAG) species, has long been developed as an efficient method of joining workpieces in industrial application. As shown in prior art FIG. 1, GMAW systems typically include a welding torch or gun 1, a power supply 2, a wire feeder 3, and a shielding gas supply 4 and gas line 5. In typical use, the torch is manipulated to produce an electric arc adjacent positioned workpieces, and more preferably oriented so as to maintain a consistent torch tip-to-work distance from the workpieces. The heat energy produced by the arc penetrates the workpieces to produce the weld pool, and a consumable anode electrode typically fuses to provide filler material to the weld pool in a globular, short-circuiting, or spray configuration.

The heat energy produced, however, negatively affects the operation and useful life of torch components located within a zone of influence. For example, it has long been appreciated that torch nozzle components suffer premature failure as a result of exposure to the high temperatures and quantities of heat energy during welding.

Figure 1:
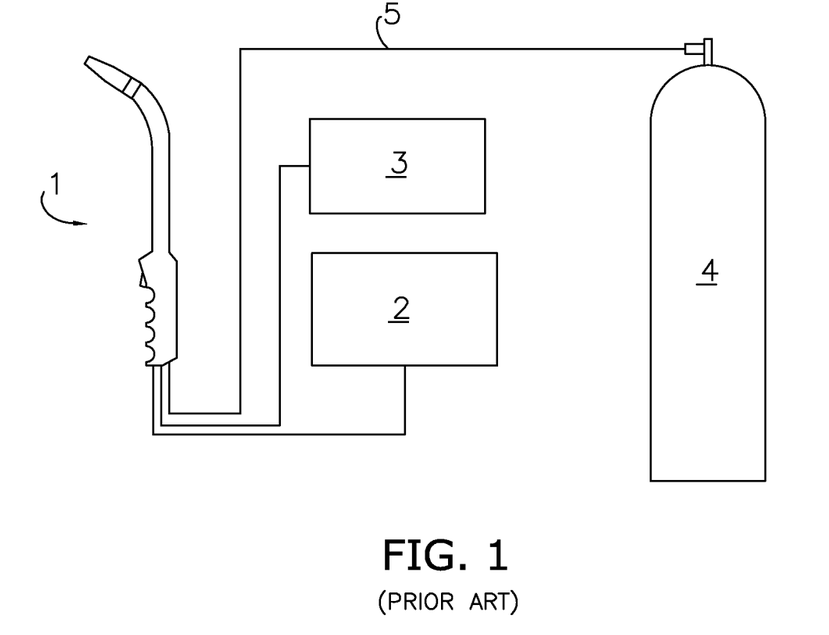
FIG. 1 is a schematic elevation of a prior art GMAW system, particularly illustrating a torch, power supply, wire feeder/reel, shielding gas supply tank and gas line, and an air-based cooling system.
Figure 1A:
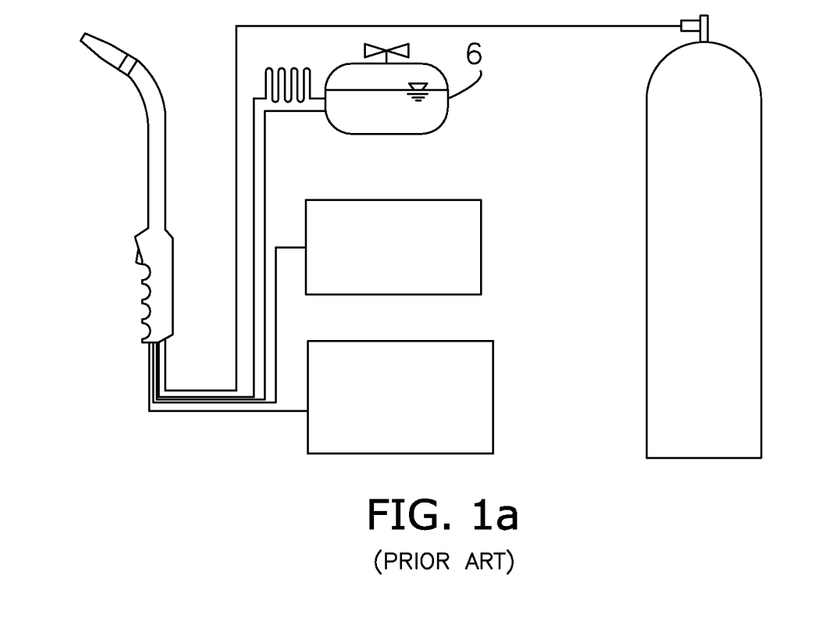
FIG. 1a is a schematic elevation of the system shown in FIG. 1, wherein a water-based cooling system, including a separate radiator and return line, replaces the air-based system.

As a result, conventional GMAW systems also typically include air or water-based cooling subsystems 6 (FIGS. 1 and 1a). However, both of these systems present respective concerns. For example, between the two, air cooled systems are less complex and costly, partially because they don't require an independent radiator and extra hoses to carry heated fluid. Due to a lower thermal cooling efficiency, however, the power cable on air-cooled torches contain more copper than on water-cooled torches, so as to help prevent the cable insulation from melting or burning. This results in air-based systems being less flexible and maneuverable than water-based systems, which thereby decreases operator comfort. With further respect to thermal efficiency, it is appreciated that air-based systems provide the added disadvantage of greater consumables cost. That is to say, water-based systems enable torch components to run cooler, which results in longer life and less downtime than with air-cooling.

SUMMARY OF THE INVENTION

The present invention presents a novel heat pipe torch cooling system that combines the advantages of air and water-based cooling, and limits their respective concerns. Among other things, the invention is useful for providing a facilely implemented cooling system that reduces manufacturing and operational costs in comparison to prior art systems.

Utility of invention further includes substantially improved thermal efficiency in comparison to prior art systems, which in turn results in increased torch consumable life. More particularly, the system provides passive operation that relies upon the heat energy by-product from the welding process and requires no additional energy consumption. Utilization of latent heat of vaporization provides substantially greater heat absorption capacity in comparison to prior art convection and conduction cooling methods.

The inventive system also provides a self-contained compact cooling system devoid of ancillaries, such as a separate radiator, pump, motor, fluid supply tank, or fluid delivery network, and as such provides improved maneuverability and operator comfort in comparison to prior art systems. Finally, because there are no moving parts, repair and replacement costs associated with cooling are also reduced.

In general, the heat pipe cooling system is presented and adapted for use with a GMAW torch. As well known in the art, the torch produces a heated zone having a minimum operating temperature, when operated within an ambient environment presenting an average temperature. The system includes a working fluid having a boiling temperature range less than the operating temperature and greater than the average temperature. The system further includes an elongated thermally conductive container defining a first average cross-sectional area, and an interior space for storing the fluid. Lastly, a capillary structure, inserted within the container, defines a second average cross-sectional area less than the first area. The structure is configured to extend and draws fluid from a remote end section to a first end section of the container. The container is fixedly connectable to the body, so as to secure the first end section within the zone and the remote end section within the environment.

Other aspects and advantages of the present invention will be apparent from the following detailed description of the preferred embodiment(s) and the accompanying drawing figures.

BRIEF DESCRIPTION OF DRAWINGS

Preferred embodiments of the invention are described in detail below with reference to the attached drawing figures, wherein.

DETAILED DESCRIPTION OF THE INVENTION

With collective reference to FIGS. 2-9a, the present invention concerns a heat pipe cooling system 10 adapted for use with a welding torch 12 comprising a nozzle 12a and body 12b. The inventive system 10 is adapted for use with a variety of torch configurations, including manual and robotic gun configurations, and presents both integrated and retrofitted embodiments further described herein. More particularly, the system 10 may be integrated with or retrofitted so as to be securely and removably coupled to the torch 12.

As illustrated, the torch 12 functions to produce heat energy in the form of an electric arc sufficient to melt the base material, and as a by-product, a heated zone 14 defined by a minimum operating temperature. The specifications for welding the workpieces 16,18 are dependent upon workpiece size and composition, and stack configuration. For example, it is appreciated by those of ordinary skill in the art that gas metal arc-welding of two-stack 16-gauge mild steel, requires at least 160 amps with 100 percent carbon dioxide shielding gas. For the purposes of this invention, the torch 12 shall be deemed to operate within an ambient environment presenting an average temperature substantially equal to room temperature (i.e., 21° C.). The system 10 is described and illustrated herein with respect to a gas metal arc welding (GMAW) system; however, it is certainly within the ambit of the invention to utilize the system 10 with other welding apparatuses that produce a heated zone wherein consumables are located.

The system 10 is operable to accelerate the dissipation of heat energy from the heated zone 14 (FIG. 2), so as to extend the life and reduce costs associated with the repair and replacement of torch nozzle consumables. Unlike conventional air and water-based cooling systems, the inventive system 10 presents a self-contained and stand alone heat pipe that does not require separate fluid supplies, motors, fans, pumps, or additional hoses/cables. The system 10 continually functions over a plurality of repetitive thermodynamic cycles as long as the heat zone 14 contributes energy thereto.

The system 10 generally comprises a plurality of base parts, including an enclosed container 20, a wick (i.e., capillary structure) 22, and a working coolant fluid 24 (said base parts collectively referred to herein as a "heat pipe"). The components of the heat pipe are chemically and functionally compatible, such that deleterious conditions, such as corrosion, do not occur. The longitudinal lengths of the container and wick are generally congruent so as to perform the intended function of the invention. It is appreciated that the length of the heat pipe is inversely proportional to the Axial Power Rating (APR), whereas the diameter is directly proportional to its APR. As shown in the illustrated embodiment the length, configuration, and diameter of the heat pipe is limited by the configuration of the torch body 12b.

Figures 3, 4:
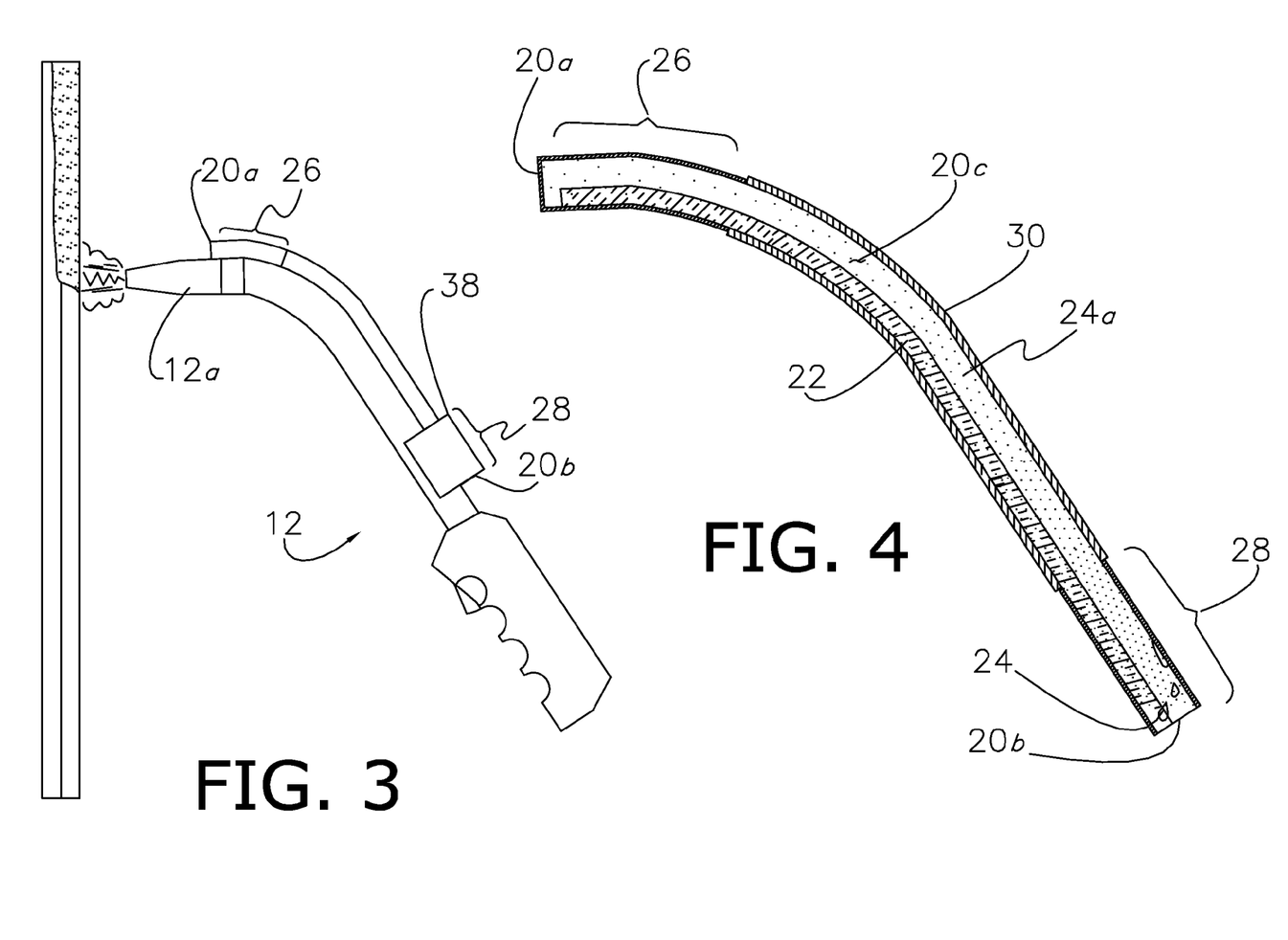
FIG. 3 is a longitudinal elevation of the workpieces, torch and cooling system shown in FIG. 2, wherein the torch is in a nozzle ascending orientation.
FIG. 4 is an enlarged longitudinal cross-section of a cooling system in accordance with a preferred embodiment of the invention, particularly illustrating a container defining vaporizer and condenser sections, a wick housed therein, and the working fluid being vaporized, drawn by the wick, and re-condensed.

The system 10 functions to direct the fluid to within the zone 14, so that it vaporizes (FIG. 3). The configuration of the container 20 and gaseous pressure causes the vaporized fluid (i.e., vapor) 24a to migrate within the container 20, from the zone 14, and towards a remote location where it re-condenses into a liquid. As it condenses, the vapor 24a gives up the heat it acquired during vaporization. Thus, as shown in FIGS. 3 and 4, the container 20, wick 22 and fluid 24 cooperatively present vaporizer and condenser sections 26,28 (i.e., vaporizer and condenser). The vaporized fluid 24a is replaced by fluid drawn to the zone 14 by the wick 22. Preferably, the fluid quantity is completely contained within the capillaries of the wick 22, and is therefore interrelated with the capillary volume of the wick 22.

The fluid 24 presents a vapor temperature range within the approximate operating temperature band of the zone 14. That is to say the fluid boiling temperature range is preferably less than the minimum operating temperature of the zone 14 and greater than the average temperature of the ambient environment. More preferably, the fluid 24 presents a boiling temperature range less than fifty-five percent of the minimum temperature of the zone 14, and greater than one hundred twenty-five percent of the average temperature of the environment, so as to promote responsive vaporization and condensation. Most preferably, the boiling temperature range is less than twenty-five percent of the minimum zone temperature, and greater than one hundred and fifty percent of the average environment temperature.

More particularly, the container 20 presents a hermetically sealed, hollow tube, which defines an enclosed interior space 20c (FIG. 4) having an average cross-sectional area, isolates the working fluid 24 and wick 22 from the outside environment, and presents proximate and remote end sections 20a,b relative to the zone 14. Once the fluid 24 and wick 22 have been placed therein, sub-sections of the container 20 are preferably brazed and/or soldered together to encapsulate the other components and produce a non-corrosive and heat retaining joint. So as to promote heat transfer to and from the fluid 24, it is appreciated that the container 20 is formed of thermally conductive material and preferably presents minimal wall thickness at least at the vaporizer and condenser sections 26,28 (FIG. 4).

In addition to enabling the transfer of heat to and from the fluid 24, the container 20 is configured to sustain the pressure differential across its walls. More preferably, the container 20 is configured and formed of material, so as to present a sufficient rupture strength; as it is appreciated that the required structural capacity of the container 20 increases with the quantity of fluid 24 vaporized during operation, due to the volumetric difference between liquid and gaseous phases. Suitable materials for constructing the container include aluminum, copper, and flexible materials. Alternatively, the container 20 may consists of an aggregate of sections formed of differing materials, wherein the vaporizer and condenser sections are formed of a material having a greater thermal conductivity than that of the remaining sections. Finally, as best shown in FIG. 4, the remainder 30 of the container 20 intermediate the vaporizer and condenser sections 26,28 may present greater wall thickness to provide added structural capacity.

Figure 2:
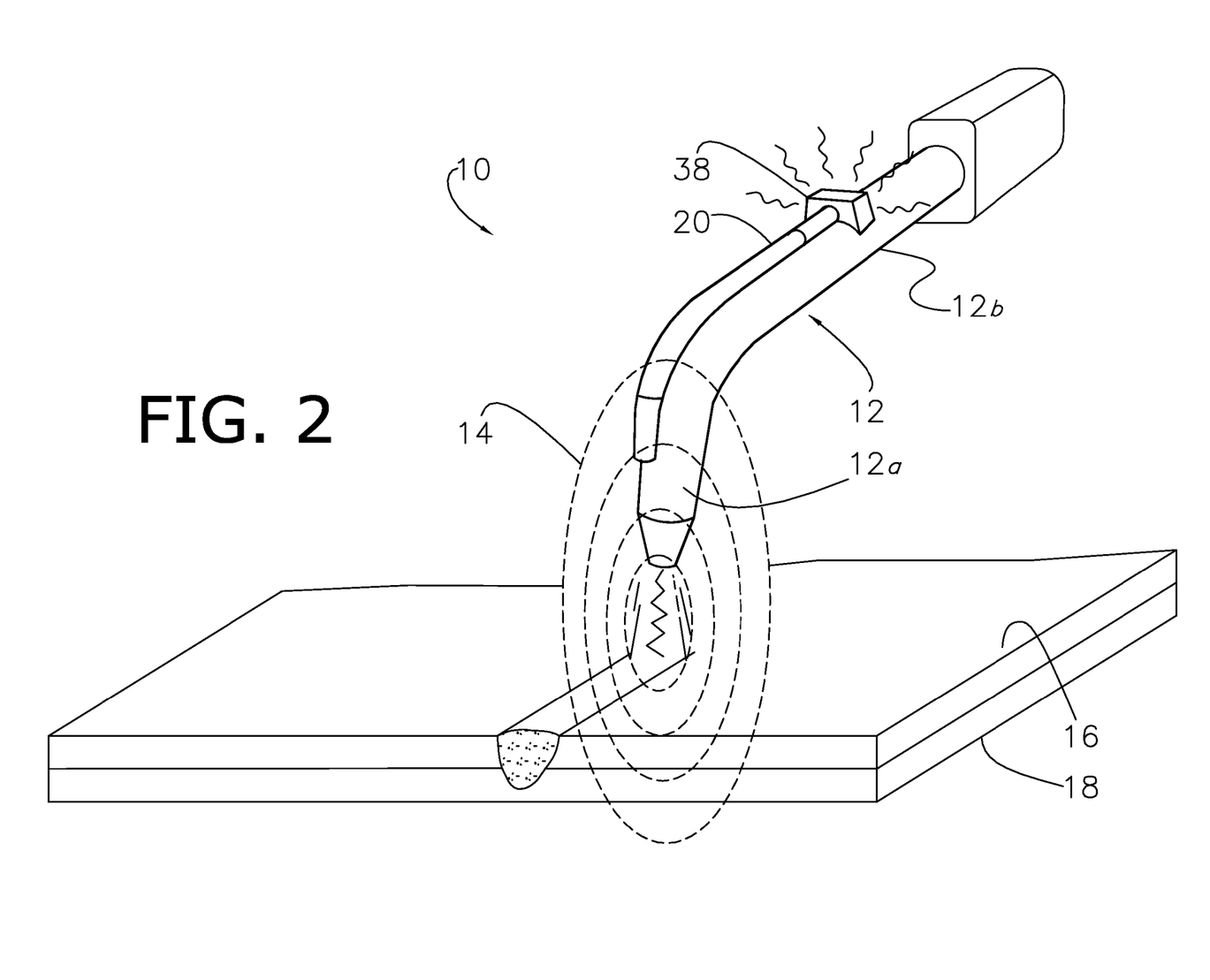
FIG. 2 is a perspective view of two workpieces being welded by a GMAW torch having a heat pipe cooling system in accordance with a preferred embodiment of the invention, particularly illustrating a heated zone.
Figures 5, 6, 6A:
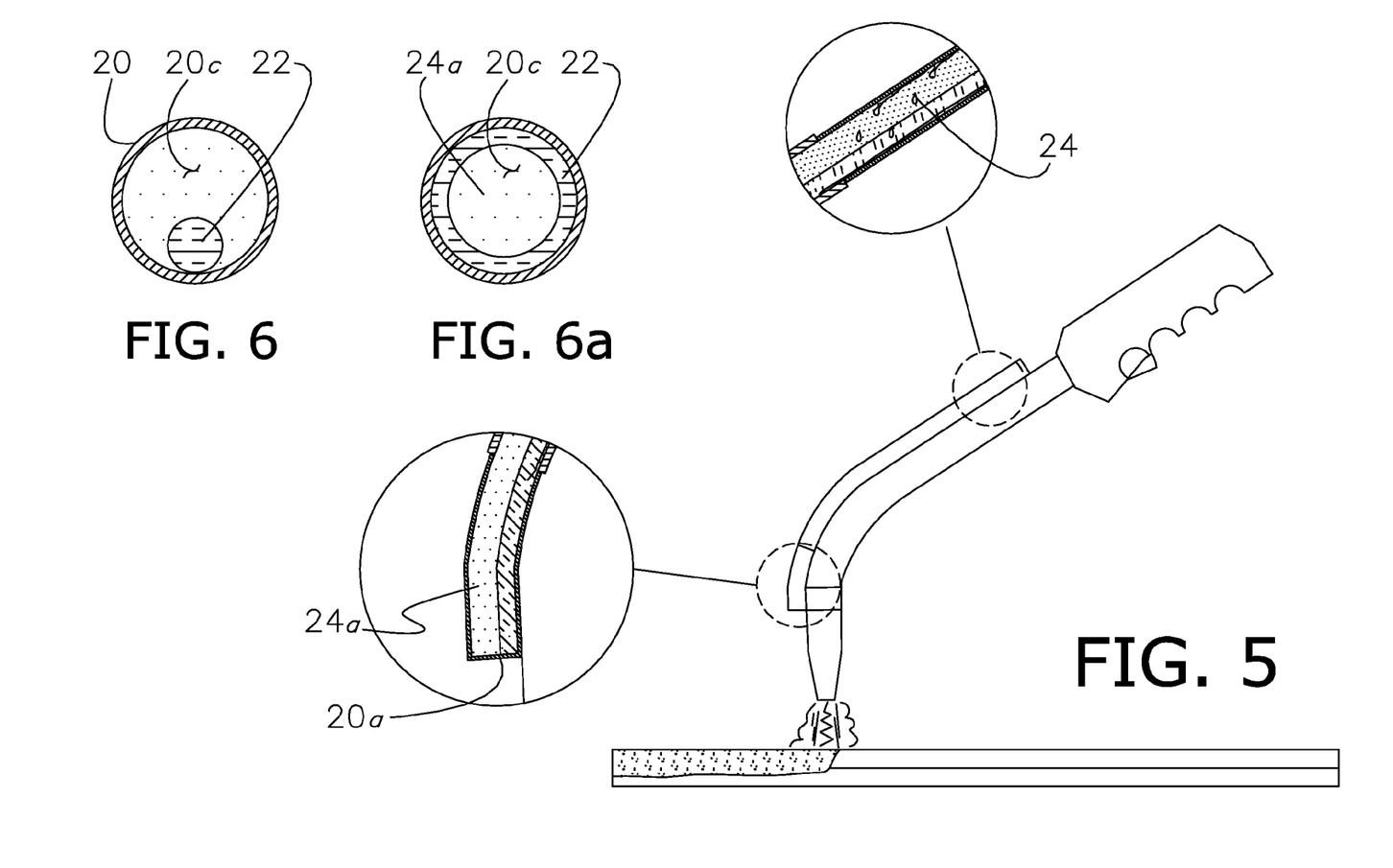
FIG. 5 is a longitudinal elevation of the workpieces, torch and cooling system shown in FIG. 3 in a nozzle descending orientation, with enlarged cross-sectional insets of the vaporizer and condenser sections, particularly illustrating the working fluid.
FIG. 6 is a lateral cross-section of the cooling system shown in FIGS. 3 through 5.
FIG. 6a is a lateral cross-section of a cooling system in accordance with a preferred embodiment of the present invention, wherein the capillary structure presents an annular configuration.

The system 10 is operable to function in both a nozzle ascending and a gravity assisted descending orientation, wherein the proximate end section 20a is positioned within the zone 14 during operation (FIGS. 2 and 3). In the nozzle ascending orientation (FIGS. 3 and 4), the wick 22 functions to draw the fluid up to the vaporizer section 26 and zone 14. The fluid 24 is vaporized directly from the most proximal portion of the wick 22 and then migrates back towards the opposite end pursuant to gaseous pressure and gravity. In a nozzle descending position (FIG. 5), gravity as well as the capillary network of the wick 22 function to draw fluid 24 to the proximate end section 20a and zone 14. At the condenser 28, precipitation occurs, wherein the vapor 24a condenses into droplets that immediately fall back towards the proximate end before being re-absorbed by the wick 22. As shown in FIG. 5, adhesion also occurs at this location, as water molecules adjacent the walls of the container 20 collect and flow down towards the proximate end and into the wick 22. Once back at the vaporizer 26, the process is repeated.

The wick 22 is inserted within the interior space 20c (FIG. 4), and as such presents a cross-sectional area less than that of the space 20c (FIG. 6). More preferably, the wick 22 presents a cross-sectional area less than fifty-percent of the cross-sectional area of the interior space 20c, so as to facilitate the migration of the fluid vapor 24a. The wick 22 presents a porous structure that utilizes capillary action to draw the fluid 24 from the remote end of the container through its interstitial capillaries and to the vaporizer 26. As such, the wick 22 generally extends from the remote end 20b and to the first end section 20a.

Fibrous materials, such as carbon fibers having longitudinal grooves on their surfaces, are preferably used to form the wick 22, as it is appreciated that carbon fiber wicks generally exhibit greater heat transport capability. Suitable wick materials may also include steel, aluminum, nickel and copper, as conventionally fabricated using metal foams or felts to produce various ranges of pores. It is also appreciated that the capillary head generated by the wick decreases, while wick permeability increases with increased pore size. It is within the ambit of the invention to incorporate metal mandrels during felt fabrication so as to produce arterial structures (i.e., at least one artery) within the wick 22 that further facilitate vapor migration.

The preferred wick 22 may present a circular cross-section (FIG. 3a), as it is appreciated that this configuration yields the greatest exposed surface area. However, it is well within the ambit of the present invention for other (e.g., polygonal) configurations to be utilized. More preferably, the inside walls of the container 20 are lined with an annular wick 22 (FIG. 6a). In this configuration, the outer diameter of the wick 22 is slightly less than (e.g., 95 to 99 percent of) the inside diameter of the container 20, so as to form superjacent layers therewith. The walls of the wick present an optimized thickness cooperatively configured with the space 20c to maximize the heat transport capability of the pipe. The vaporized fluid 24a fills the hollow center of the wick 22, and spreads throughout the interior space 20c, until it reaches the condenser 28. Finally, it is also appreciated that the wick 22 may be mesh reinforced to increase stability.

The preferred fluid 24 presents high thermal conductivity, low liquid and vapor viscosities, and to promote anti-gravity migration within the wick 22, high surface tension. It is appreciated that surface tension between the fluid 24 and wick material generates the necessary capillary driving force. As such, the fluid 24 and wick 22 are also cooperatively configured so that the fluid 24 wets, and more preferably forms a contact angle of zero with the wick 22 and walls of the container 20. The fluid 24 is selected such that the vapor pressure of the vaporized fluid 24a results in low vapor velocities. This, it is appreciated, promotes heat transfer into the vaporized fluid 24a. Moreover, the thermal conductivity of the preferred fluid 24 is relatively high so as to minimize radial temperature deviation within the chamber, and prevent excessive heating and/or nucleate boiling at the radial extremities. Thus, where a typical GMAW welding process yields minimum zone temperatures of approximately 300° C., suitable liquids at room temperature having atmospheric boiling points substantially less than 300° C. include acetone, methanol, perfluoromethylcyclohexane (also known as FLUTEC PP2™), ethanol, water and toluene. With a boiling point of approximately 360° C., mercury may be utilized with higher heat welding applications.

During operation, the fluid 24 absorbs heat energy according to its latent heat capacity. Once the fluid 24 reaches its boiling point, it absorbs more heat in effort to undergo a gaseous phase change; this later quantity representing the heat of vaporization. As such, the latent heat capacity and heat of vaporization are important parameters when selecting the working fluid 24. In the preferred embodiment, the fluid 24 is water, as it is appreciated that it takes more heat to raise the temperature of 1 gram of water by 1 degree Celsius than any other liquid, except ammonia. It is also appreciated that its heat of vaporization is greater than that of any other liquid, due to hydrogen bonding. Finally, during operation vapor particles 24a further absorb and are energized by heat energy, which accelerates migration away from the zone 14. As previously mentioned, this process provides a substantial increase in thermal efficiency in comparison to prior art air and water-based systems that solely rely upon the heat capacity of a flowing fluid.

Thus, a suitable container 20 for use with the present invention may be formed of aluminum material at the vaporizer and condenser sections 26,28, defines an interior space cross-sectional area of 20 mm with an average diameter of approximately 5 mm, a longitudinal length of 30 cm, and presents a wall thickness within the range 1 to 2 mm. A suitable working fluid 24 is water. A suitable wick 22 consists essentially of fibrous carbon material and presents an annular configuration having an outside diameter approximately 4.9 mm and a 1 mm wall thickness.

Figures 7, 7A:
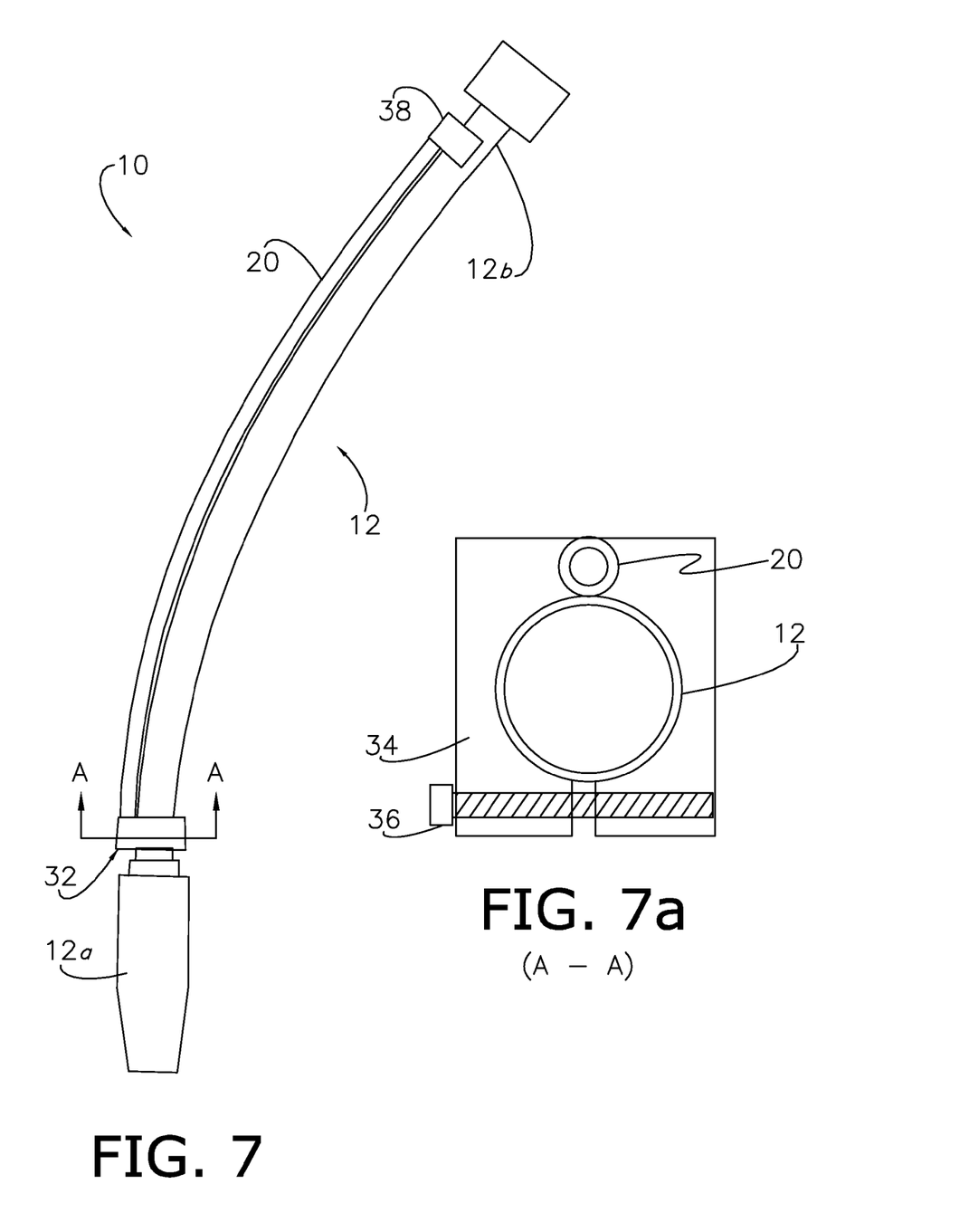
FIG. 7 is an elevation view of a curvilinear GMAW torch and heat pipe cooling system in accordance with a preferred embodiment of the invention, particularly illustrating a heat exchange clamp adjacent a vaporizer section of the pipe, and an opposite end retainer.
FIG. 7a is a cross-section of the clamp, pipe, and torch shown in FIG. 7, taken along line A-A therein.

In a preferred embodiment, the heat pipe system 10 is further retrofitted so as to be interchangeably coupled to most conventional GMAW torch configurations and sizes. For example, as shown in FIGS. 7 and 7a, the preferred system 10 may be retrofitted by attaching a clamp 32 to the container 20. The clamp 32 includes a clamping block 34 that slidably engages, so as to form a collar with the container 20, and a fastener 36 that applies the holding force thereto. Further, a heat pipe retainer 38 may be similarly provided to secure the remote end section 20b to one of a plurality of conventional torches (FIG. 7).

The system 10 may further include a variety of heat exchangers that enhance the afore-described performance of the heat pipe. In the preferred embodiment shown in FIG. 8, a heat exchange block 40, which acts as a heat sink, is added to produce a temperature differential and accelerate heat dissipation. The container 20 is preferably attached to the heat block 40 at the condenser 28. A suitable heat exchange block 40 for use with the present invention is formed of a highly thermal conductive material, such as copper and presents a substantially greater surface area per unit length than the pipe.

Figures 8, 9, 9A:
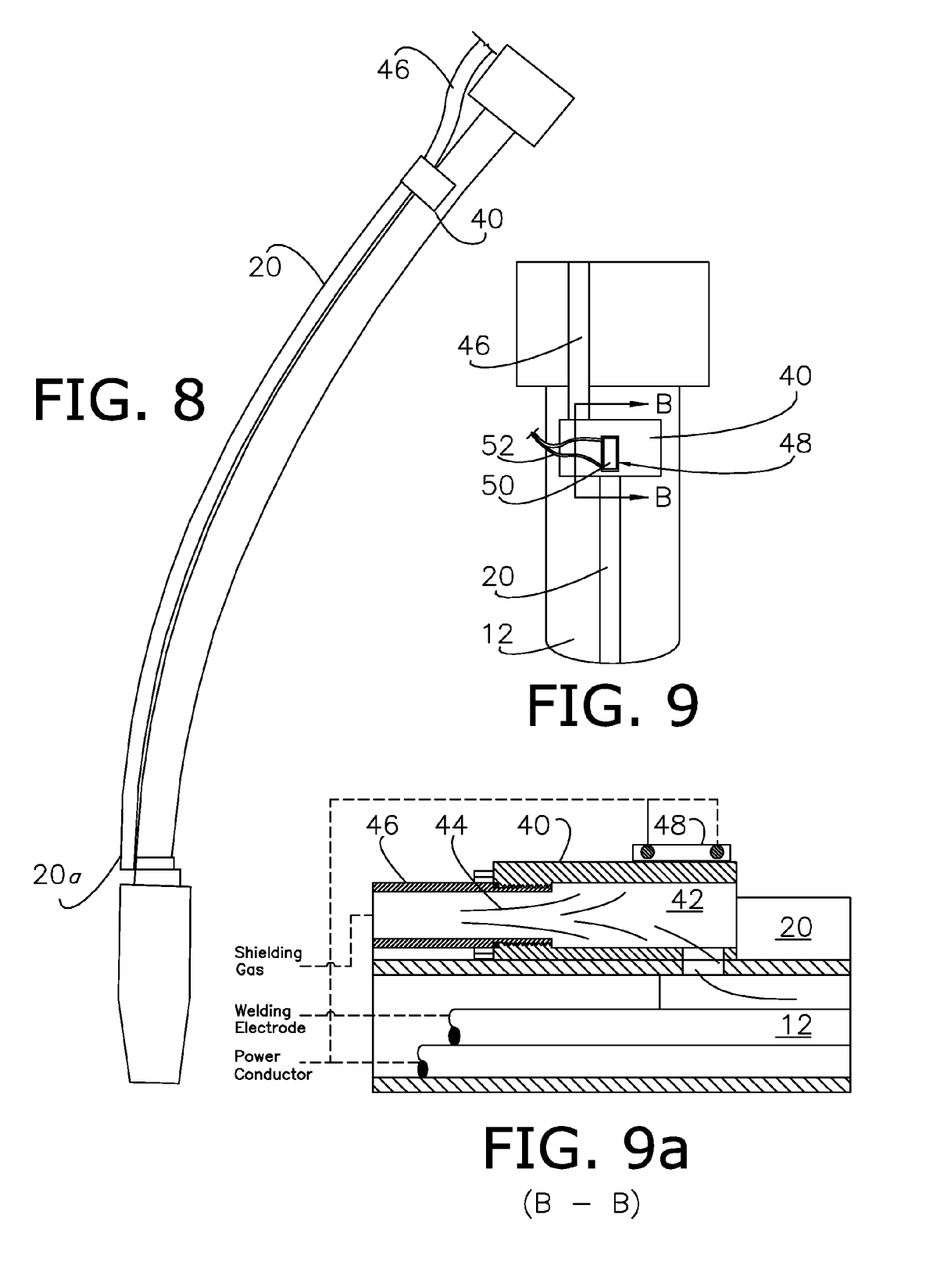
FIG. 8 is an elevation view of a curvilinear GMAW torch and heat pipe cooling system in accordance with a preferred embodiment of the invention, particularly illustrating a heat exchange block with shielding gas feed adjacent a condenser section of the pipe.
FIG. 9 is a partial top view of a torch and cooling system in accordance with a preferred embodiment of the invention, particularly illustrating a heat exchange block with shielding gas feed, and a Peltier device adjacent the condenser section of the pipe.
FIG. 9a is a cross-section of the partial view of the torch and system shown in FIG. 9 taken along line B-B therein.

More preferably, the heat exchange block 40 also defines shielding gas ports 42, as shown in FIGS. 8-9*a*. In this configuration, the block 40 defines at least one port (i.e., passage) 42 that allows a quantity of shielding gas 44 to flow through on its way to the torch nozzle 12*a*. The gas conduit(s) 46 is preferably discontinued at, and securely fastened to the block 40, so that the flow of gas directly engages the block 40. The block-conduit interface preferably presents a sealed joint (FIG. 9*a*). It is appreciated that the provision of shielding gas passage increases the efficiency of the heat sink, and therefore the rate of heat dissipation from the vapor 24*a* for various reasons. First, it is appreciated that conventional GMAW shielding gases typically present in-chamber temperatures less than room temperature, second as the gas 44 transitions from high to low pressure it produces a temperature differential, and third, the provision of conducting heat withdrawal from the pipe and the increase in surface exposure to fluid flow provided by the block 40 increases heat transfer.

In another alternative shown in FIG. 9, a Peltier device (i.e., thermoelectric module) 48 may be utilized to further increase the rate of heat dissipation. As is known in the art, the Peltier device 48 includes a plurality of thermocouples (not shown) comprising heavily doped semiconductors (e.g., presenting both N-type and P-type pieces bonded together) sandwiched between two planar substrates 50, and leads 52 for applying a voltage thereto. This creates an active heat pump that provides a temperature differential (i.e., 70 degrees Celsius, ideally) across the planar substrates 50 that is greater than ambient exposure to the block alone, and therefore reduces torch component temperatures to less than room temperature. Like the heat pipe, the Peltier device 48 is reliable and requires minimal maintenance, as there are no moving parts. As shown in FIGS. 9 and 9*a*, the heat exchange block 40 and the Peltier device 48 are used in conjunction. More preferably, the block 40 and device 48 are positioned, so as to directly engage the container 20 adjacent the condenser 28. The Peltier device 48 is preferably powered by the welding circuit and operates only during the welding cycle.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventor hereby states his intent to rely on the Doctrine of Equivalents to determine and assess the reasonably fair scope of the present invention as it pertains to any apparatus, assembly, or method not materially departing from but outside the literal scope of the invention as set forth in the following claims.

What is claimed is:

1. A heat pipe cooling system adapted for use with a welding torch, wherein said torch includes a body and a nozzle, and produces a heated zone having a minimum operating temperature when operated within an ambient environment presenting an average temperature, said heat pipe cooling system comprising:
   a self-contained heat pipe defining a sealed interior space enclosing a working fluid;
      the heat pipe defining first and second end sections in fluid communication with the working fluid, and characterized by a first average cross-sectional area; and
      the working fluid having a boiling temperature range less than the minimum operating temperature and greater than the average temperature,
      the heat pipe being formed of thermally conductive material, and configured to be fixedly connectable to the body so as to secure the first end section within the heated zone and to position the second end section within the ambient environment.

2. The system as claimed in claim 1, further comprising:
   a capillary structure insertable within the interior space, defining a second average cross-sectional area less than the first average cross-sectional area, configured to extend and operable to draw fluid from the second end section to the first end section.

3. The system as claimed in claim 1, wherein the fluid presents a boiling temperature range less than fifty-five percent of the operating temperature and greater than one-hundred and twenty-five percent of the average temperature.

4. The system as claimed in claim 3, wherein the fluid presents a boiling temperature range less than twenty-five percent of the operating temperature and greater than one-hundred and fifty percent of the average temperature.

5. The system as claimed in claim 2, wherein the second average cross-sectional area is less than fifty percent of the first average cross-sectional area.

6. The system as claimed in claim 2, wherein the heat pipe and the capillary structure each present annular cross-sectional configurations having respective inside and outside diameters, and the outside diameter of the capillary structure is less than fifty percent of the inside diameter of the heat pipe.

7. The system as claimed in claim 1, wherein the heat pipe is formed of a material selected from the group consisting of aluminum, copper and flexible materials.

8. The system as claimed in claim 1, wherein the working fluid is selected from the group consisting essentially of acetone, methanol, perfluoromethylcyclohexane, ethanol, water, and toluene.

9. The system as claimed in claim 2, wherein the capillary structure is formed of fibrous carbon material.

10. The system as claimed in claim 2, wherein:
    the capillary structure is formed of one of a metal foam and a metal felt;
    the one of the metal foam and the metal felt is characterized by a plurality of arterial structures including at least one arterial structure characterized by a pore size different than the pore size of another of the arterial structures.

11. The system as claimed in claim 1, wherein the self-contained heat pipe is configured to substantially conform to an exterior surface of the body when fixedly connected to the body.

12. The system as claimed in claim 1, further comprising:
    a heat exchange clamp configured to fixedly intercouple the heat pipe and torch, said clamp including a clamping block and threaded fastener.

13. The system as claimed in claim 1, wherein the heat pipe and fluid cooperatively present cyclically communicating vaporizer and condenser sections, when the torch is operated in the environment.

14. The system as claimed in claim 13, further comprising:
    a heat exchange block contacting and configured to accelerate heat energy dissipation from the condenser section, so as to form a heat sink;
    wherein the heat exchange block presents a substantially greater surface area per unit length than the heat pipe.

15. The system as claimed in claim 14, wherein the block defines at least one port configured to receive a shielding gas flow through the port, so as to further accelerate heat energy dissipation from the condenser section.

16. The system as claimed in claim 13, further comprising:
    a Peltier device contacting and configured to draw heat energy from the condenser section.

17. The system as claimed in claim 16, further comprising an electrical circuit in communication with the Peltier device and configured to selectively power the Peltier device only during a welding cycle of the torch.

18. The system as claimed in claim 13, wherein the heat pipe comprises an aggregate of sections including the vaporizer and condenser sections and a remainder, the vaporizer and condenser sections are formed of a first material having a first thermal conductivity rate, and the remainder is formed of a second material having a thermal conductivity rate less than the first material.

19. A heat pipe cooling system adapted for use with a GMAW torch, wherein said torch includes a body and a nozzle, and produces a heated zone having an operating temperature when operated within an ambient environment presenting an average temperature, said heat pipe cooling system comprising:

a heat pipe configured as a hermetically sealed hollow tube defining an interior space terminating in first and second end sections of the heat pipe;

the heat pipe enclosing a working fluid and a capillary structure retained within the interior space;

wherein:

the working fluid is in fluid communication with the first and second end sections and is characterized by a boiling temperature range less than twenty-five percent of the operating temperature and greater than one hundred and fifty percent of the average temperature; and the capillary structure is configured to extend and operable to draw fluid from the second end section to the first end section, said heat pipe being self-contained such that the heat pipe is selectively connectable to the body, so as to secure the first end section within the heated zone and the second end section within the ambient environment, when the torch is operated within the ambient environment.

* * * * *